US011602983B2

(12) United States Patent
Malina et al.

(10) Patent No.: US 11,602,983 B2
(45) Date of Patent: Mar. 14, 2023

(54) BUMPER PROTECTORS INCLUDING MOUNTING AND STOWING FEATURES

(71) Applicant: Keystone Global LLC, Congers, NY (US)

(72) Inventors: Eric Malina, Upper Saddle River, NJ (US); Ronny Malina, Brooklyn, NY (US)

(73) Assignee: KEYSTONE GLOBAL LLC, Congers, NY (US)

( * ) Notice: Subject to any disclaimer, the term of this patent is extended or adjusted under 35 U.S.C. 154(b) by 0 days.

(21) Appl. No.: 17/236,642

(22) Filed: Apr. 21, 2021

(65) Prior Publication Data

US 2022/0339996 A1    Oct. 27, 2022

(51) Int. Cl.
*B60J 11/06*    (2006.01)
*B60R 19/44*    (2006.01)

(52) U.S. Cl.
CPC ............. *B60J 11/06* (2013.01); *B60R 19/44* (2013.01)

(58) Field of Classification Search
CPC ................................. B60R 19/44; B60J 11/06
USPC ........................................................ 293/142
See application file for complete search history.

(56) References Cited

U.S. PATENT DOCUMENTS

| 5,275,460 | A  | * | 1/1994  | Kraus  | ...................... | B60J 11/06 |
|           |    |   |         |        |                        | 160/DIG. 16 |
| 6,283,518 | B1 | * | 9/2001  | Burtin | ...................... | B60R 19/44 |
|           |    |   |         |        |                        | 293/142    |
| D617,259  | S  |   | 6/2010  | Malina et al. | | |
| 7,740,294 | B2 |   | 6/2010  | Malina et al. | | |
| 7,866,715 | B2 |   | 1/2011  | Malina et al. | | |
| 8,047,601 | B2 |   | 11/2011 | Malina et al. | | |
| 8,393,658 | B2 |   | 3/2013  | Malina et al. | | |
| 8,531,282 | B1 | * | 9/2013  | Santiago | ................ | B60R 19/44 |
|           |    |   |         |        |                        | 340/436    |
| 8,850,727 | B2 |   | 10/2014 | Malina et al. | | |
| D756,858  | S  |   | 5/2016  | Malina et al. | | |
| D756,859  | S  |   | 5/2016  | Malina et al. | | |
| 9,505,363 | B2 | * | 11/2016 | Judd   | ...................... | B60R 19/03 |
| D799,387  | S  |   | 10/2017 | Malina et al. | | |
| D807,247  | S  |   | 1/2018  | Malina et al. | | |
| D814,368  | S  |   | 4/2018  | Malina et al. | | |
| 9,937,884 | B2 | * | 4/2018  | Dagrossa | ............... | B60R 19/44 |

(Continued)

FOREIGN PATENT DOCUMENTS

FR            3033749 A1 *  9/2016

*Primary Examiner* — Joseph D. Pape
(74) *Attorney, Agent, or Firm* — Faegre Drinker Biddle & Reath LLP

(57) ABSTRACT

A bumper protector for mounting to a vehicle includes a cushioning portion configured to abut a bumper of the vehicle. A main mounting strap is carried by the cushioning portion and is configured to be secured to the vehicle. A first support arm is carried by the cushioning portion and is configured to extend around a first corner of the bumper. A first mounting bracket is carried by the first support arm, and the first mounting bracket is configured to extend into a first wheel well of the vehicle and be secured to the vehicle. A second support arm is carried by the cushioning portion and is configured to extend around a second corner of the bumper. A second mounting bracket is carried by the second support arm, and the second mounting bracket is configured to extend into a second wheel well of the vehicle and be secured to the vehicle.

19 Claims, 11 Drawing Sheets

(56) References Cited

U.S. PATENT DOCUMENTS

| | | |
|---|---|---|
| 10,081,320 B2 | 9/2018 | Prevor et al. |
| 2003/0034660 A1* | 2/2003 | Kelly ............... B60R 19/44 |
| | | 293/142 |
| 2010/0276951 A1 | 11/2010 | Malina et al. |
| 2015/0183365 A1* | 7/2015 | Aboughanem ......... B60J 11/06 |
| | | 362/520 |

* cited by examiner

BUMPER PROTECTORS INCLUDING MOUNTING AND STOWING FEATURES

CROSS REFERENCE TO RELATED APPLICATION

None.

FIELD OF THE DISCLOSURE

The present disclosure generally relates to protectors for mounting to bumpers of parked vehicles. More specifically, the present disclosure relates to bumper protectors including mounting and stowing features.

BACKGROUND OF THE DISCLOSURE

Bumper protectors are commonly mounted to bumpers of parked vehicles to inhibit or prevent damage from contact with moving objects, such as other vehicles, bicycles, and the like. However, such protectors are typically difficult to mount to bumpers and store in vehicles when not in use. For at least these reasons, there remains a desire for bumper protectors that are less cumbersome for users.

SUMMARY OF THE INVENTION

In one aspect, the present disclosure provides a bumper protector for mounting to a vehicle. The bumper protector includes a cushioning portion configured to abut a bumper of the vehicle. A main mounting strap is carried by the cushioning portion and is configured to be secured to the vehicle. A first support arm is carried by the cushioning portion and is configured to extend around a first corner of the bumper. The first support arm includes a plurality of segments, and the plurality of segments are foldable to facilitate conformance of the first support arm to the shape of the bumper. A first mounting bracket is carried by the first support arm, and the first mounting bracket is configured to extend into a first wheel well of the vehicle and be secured to the vehicle. A second support arm is carried by the cushioning portion and is configured to extend around a second corner of the bumper. A second mounting bracket is carried by the second support arm, and the second mounting bracket is configured to extend into a second wheel well of the vehicle and be secured to the vehicle.

In another aspect, the present disclosure provides a rear bumper protector for mounting to a vehicle. The rear bumper protector includes a cushioning portion configured to abut a rear bumper of the vehicle. A first main mounting strap is carried by the cushioning portion and is configured to be secured to a trunk surface of the vehicle. A second main mounting strap is carried by the cushioning portion and is configured to be secured to the trunk surface of the vehicle. A first support arm is carried by the cushioning portion and is configured to extend around a first corner of the rear bumper. The first support arm includes a plurality of segments, and the plurality of segments are foldable to facilitate conformance of the first support arm to the shape of the bumper. A second support arm is carried by the cushioning portion and is configured to extend around a second corner of the rear bumper.

BRIEF DESCRIPTION OF THE DRAWINGS

For illustrative purposes, the drawings show embodiments which are presently preferred. However, it should be understood that the present disclosure is not limited to the embodiments illustrated in the drawings.

DETAILED DESCRIPTION OF THE DRAWINGS

Figure 1:
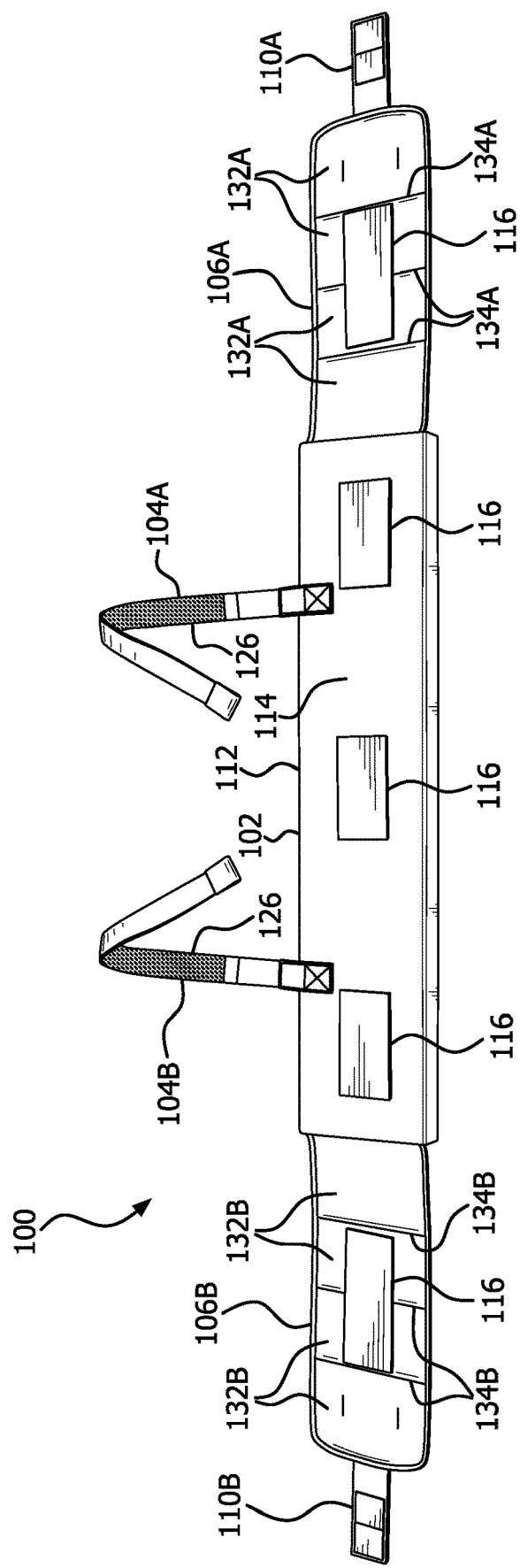
FIG. 1 is a rear view of a bumper protector according to a first embodiment of the present disclosure in an unfolded configuration.
Figure 2:
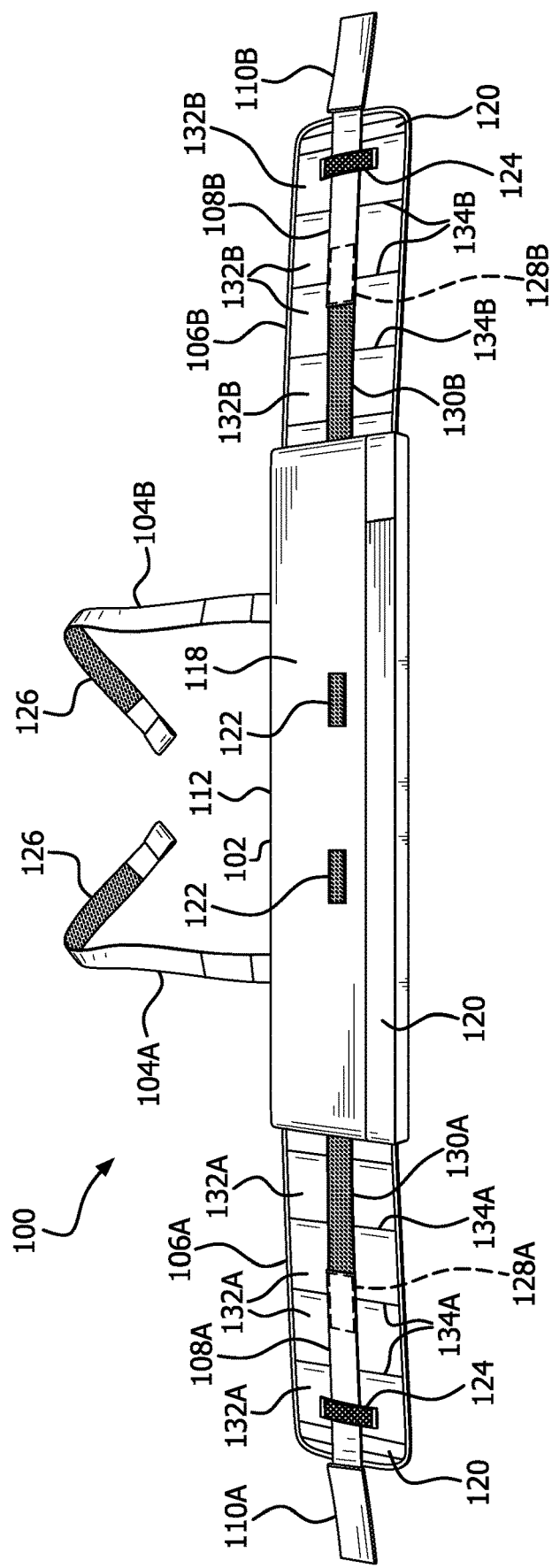
FIG. 2 is a front view of the bumper protector of FIG. 1.

Referring to the drawings, wherein like reference numerals identify corresponding or similar elements throughout the several views, FIGS. 1 and 2 illustrate a bumper protector 100 according to an embodiment of the present disclosure. Generally, the bumper protector 100 includes a cushioning or central portion 102 that is configured to abut a bumper of a parked vehicle (shown elsewhere). For example, the cushioning portion 102 may be positioned behind a rear bumper of a vehicle. The cushioning portion 102 couples to various components that facilitate coupling the bumper protector 100 to a vehicle. More specifically, the cushioning portion 102 couples to one or more main mounting straps, illustratively, a first main mounting strap 104A and a second main mounting strap 1048. The cushioning portion 102 may be permanently coupled to the first main mounting strap 104A and/or the second main mounting strap 104B, for example, via stitching. In addition, the cushioning portion 102 couples to one or more support arms, illustratively, a first support arm 106A and a second support arm 1068. The cushioning portion 102 may be permanently coupled to the first support arm 106A and/or the second support arm 1068, for example, via stitching. The first support arm 106A carries a first side mounting strap 108A (FIG. 2) and a first mounting bracket 110A, and the second support arm 1068 carries a second side mounting strap 1088 (FIG. 2) and a second mounting bracket 1108. As described in further detail below, the above features facilitate easily deploying the bumper protector 100 and stowing the bumper protector 100 in a vehicle when not in use.

With continued reference to FIGS. 1 and 2, the cushioning portion 102 and the support arms 106A and 1068 may include an internal compressible material (not shown), such as a compressible foam material, to facilitate inhibiting or preventing bumper damage from contact with other objects. As illustrated, the compressible material may be thicker in the cushioning portion 102 than the support arms 106A and 1068 to facilitate folding the support arms 106A and 1068 relative to the cushioning portion 102. The cushioning portion 102 and the support arms 106A and 1068 also include an outer layer or cover 112. The cover 112 may include an anti-slip material, such as rubber, to facilitate securing the bumper protector 100 to a vehicle. Illustratively, the cover 112 is non-removable from the cushioning portion 102 and the support arms 106A and 106B. Alternatively, the cover 112 is removable from the cushioning portion 102 and the support arms 106A and 106B.

On a first or inner side 114 of the bumper protector 100 and as shown in FIG. 1, the cover 112 carries one or more patches 116 (illustratively, five patches 116) constructed of a slip-resistant material. On a second or outer side 118 of the bumper protector 100 and as shown in FIG. 2, the cover 112 carries one or more reflective patches 120 (illustratively, three reflective patches 120). On the second surface 118, the cover 112 also carries fasteners, such as hook and loop fasteners, or a plurality of hooks 122 and a plurality of loops 124, to facilitate securing the support arms 106A and 106B to the cushioning portion 102 when the arms 106A and 106B are in folded configuration (shown elsewhere).

With continued reference to FIGS. 1 and 2, the main mounting straps 104A and 104B carry fasteners, such as a plurality of hooks 126, to facilitate securing the main mounting straps 104A and 104B to a fabric surface of the vehicle, such as the floor of the vehicle's trunk. Alternatively, the main mounting straps 104 may be secured to the vehicle in other manners. For example, the plurality of hooks 126 may detachably couple to a plurality of loops (not shown), and the plurality of loops may be secured, for example, to a metal surface of the vehicle via an adhesive. As such, the plurality of loops may remain secured to the surface of the vehicle, and the plurality of hooks 126 may be selectively attached and detached from the plurality of loops.

With specific reference to FIG. 2, the first support arm 106A couples to the first mounting bracket 110A via the first side mounting strap 108A. In some embodiments, the first side mounting strap 108A may be constructed of a stretchable or elastic material. In other embodiments, the first side mounting strap 108A may be constructed of a non-stretchable material, such as a woven material. The first mounting bracket 110A may be constructed of a bendable material and/or sized to facilitate bending by a user. The first mounting bracket 110A is carried at a first end of the first side mounting strap 108A, and a second end of the first side mounting strap 108A may couple to the first support arm 106A via an adjustable coupling, such as a plurality of hooks 128A and a plurality of loops 130A. Similarly, the second support arm 106B couples to the second mounting bracket 110B via the second side mounting strap 108B. In some embodiments, the second side mounting strap 108B may be constructed of a stretchable or elastic material. In other embodiments, the second side mounting strap 108B may be constructed of a non-stretchable material, such as a woven material. The second mounting bracket 110B may be constructed of a bendable material and/or sized to facilitate bending by a user. The second mounting bracket 110B is carried at a first end of the second side mounting strap 108B, and a second end of the second side mounting strap 108B may couple to the second support arm 106B via an adjustable coupling, such as a plurality of hooks 128B and a plurality of loops 130B.

Referring generally again to FIGS. 1 and 2, the first support arm 106A may include a plurality of segments 132A that are joined by reduced thickness portions 134A. In the illustrated embodiment, the first support arm 106A includes four segments 132A. In alternative embodiments, the first support arm 106A includes a different number of segments 132A, such as two, three, five, six, seven, eight, nine, ten or more segments 132A. Similarly, the second support arm 106B may include a plurality of segments 132B that are joined by reduced thickness portions 134B. In the illustrated embodiment, the second support arm 106B includes four segments 132B. In alternative embodiments, the second support arm 106B includes a different number of segments 132B, such as two, three, five, six, seven, eight, nine, ten or more segments 132B. The reduced thickness portions 134A and 134B may be formed by, for example, generally-vertically extending ribbing or stitching connected to the cover 112 ("generally-vertical" and variations thereof referring to a direction substantially parallel to the vertical direction of the vehicle, or substantially perpendicular to an elongated direction of the cushioning portion 102). The reduced thickness portions 134A and 134B may be more foldable than the plurality of segments 132A and 132B, respectively. The reduced thickness portions 134A and 134B may facilitate folding the support arms 106A and 106B, respectively, upon the cushioning portion 102 for storage and/or conforming to a bumper for a more precise fit, thereby providing enhanced surface contact for securing the bumper protector 100 to a bumper. In other embodiments, the first support arm 106A and/or the second support arm 106B may lack reduced thickness portions.

Figure 3:
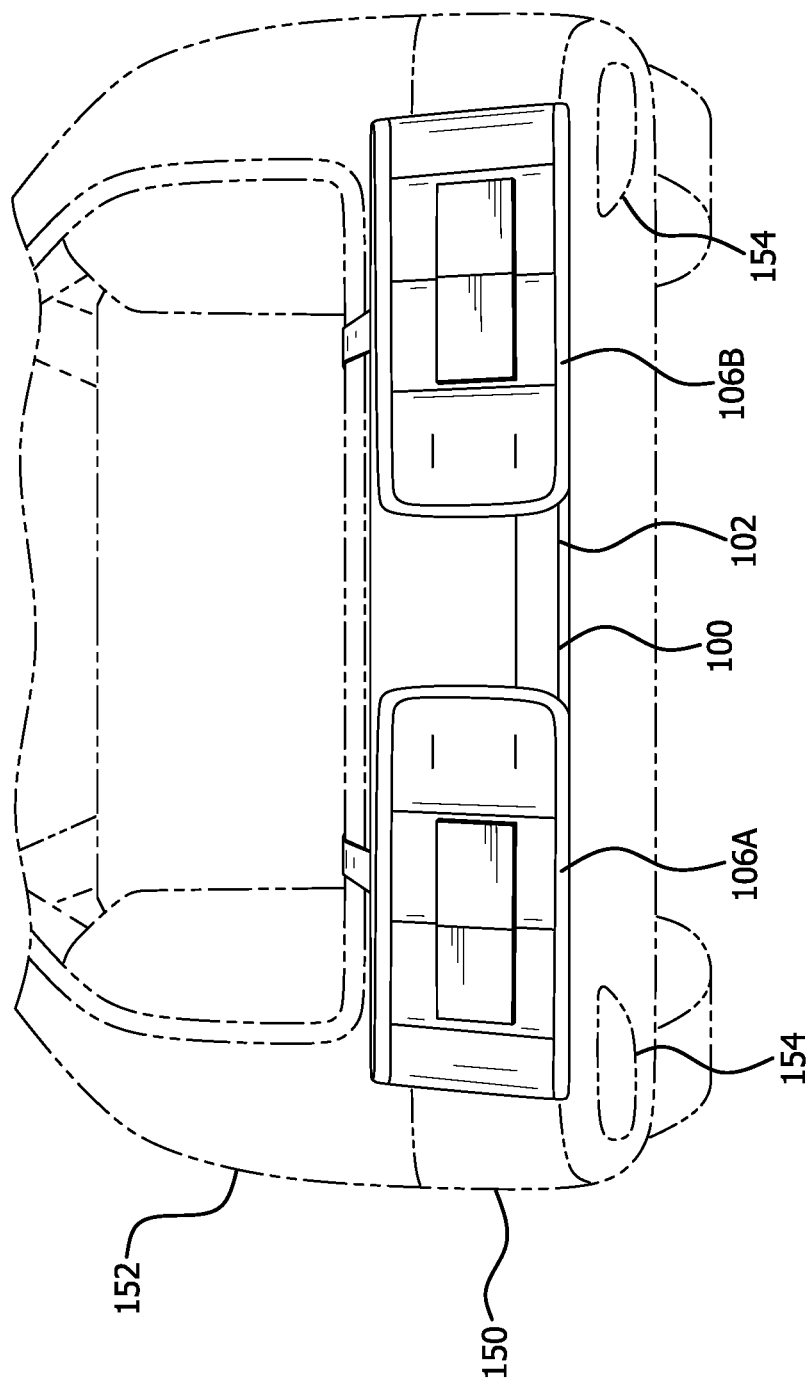
FIG. 3 is a front view of the bumper protector of FIG. 1 being mounted to the rear bumper of a vehicle.

FIGS. 3-8 illustrate an exemplary method of mounting the bumper protector 100 to a bumper 150 of a parked vehicle 152, illustratively the rear bumper 150 of the vehicle 152. The method begins as shown in FIG. 3 by providing the bumper protector 100 in the folded configuration, or with the support arms 106A and 106B folded against the cushioning portion 102 and secured via the plurality of hooks 122 and the plurality of loops 124 (both shown elsewhere). The bumper protector 100 is abutted against the bumper 150 apart from any exhaust pipes 154 of the vehicle 152.

Figure 4:
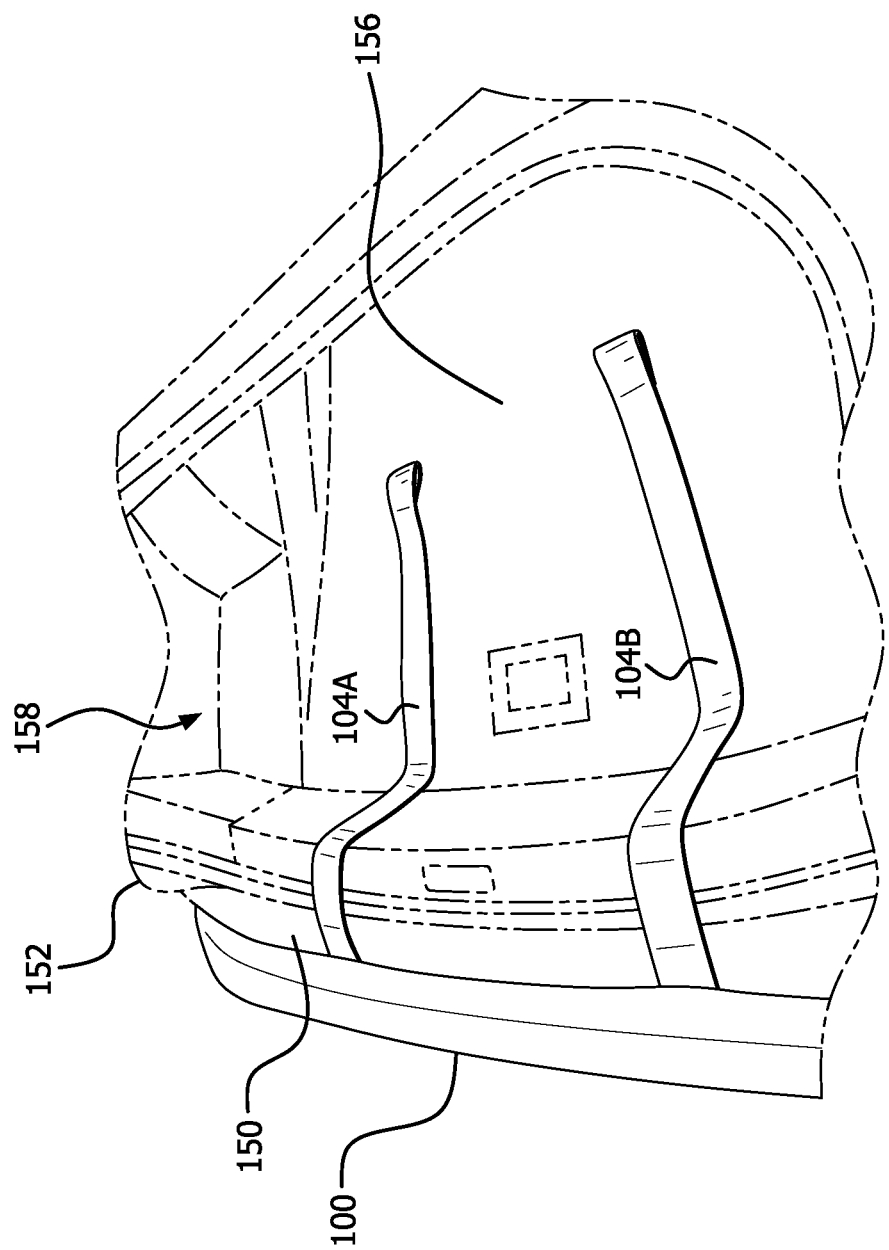
FIG. 4 is a top perspective view of trunk straps of the bumper protector of FIG. 1 being mounted to the floor of the trunk of the vehicle.

As shown in FIG. 4, the main mounting straps 104A and 104B are next secured to the vehicle 152. For example, the main mounting straps 104A and 104B are secured to a fabric floor 156 of the trunk 158 of the vehicle 152 via the plurality of hooks 126 (shown elsewhere). The trunk 158 of the vehicle 152 may then be closed.

Figure 5:
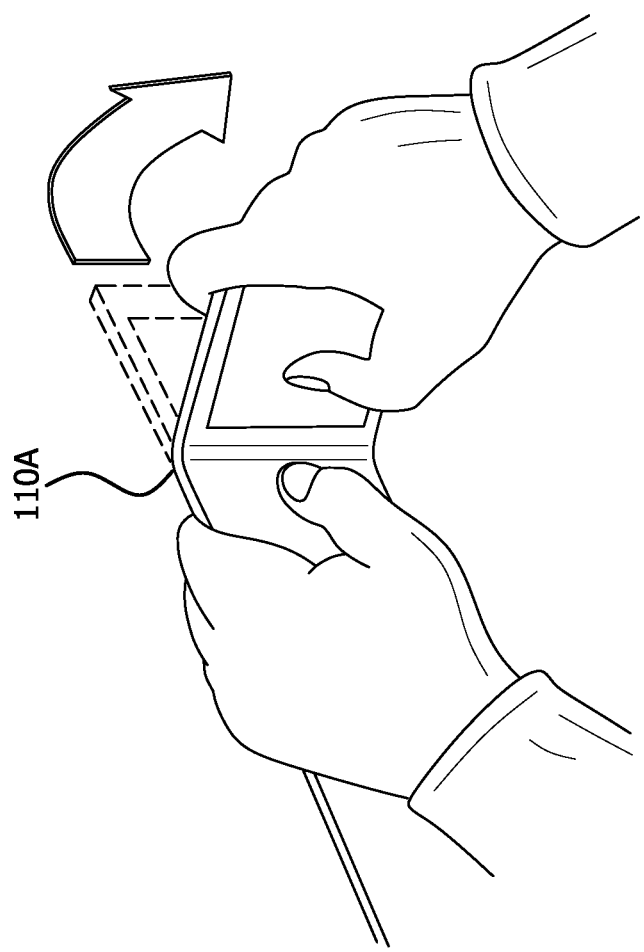
FIG. 5 is a perspective view of a bracket of the bumper protector of FIG. 1 being bent to a mounting shape.

As shown in FIG. 5, the first mounting bracket 110A is next bent to a mounting shape, specifically a V-shape, and the second mounting bracket 110B (shown elsewhere) is similarly bent to a mounting shape, specifically a V-shape.

Figure 6:
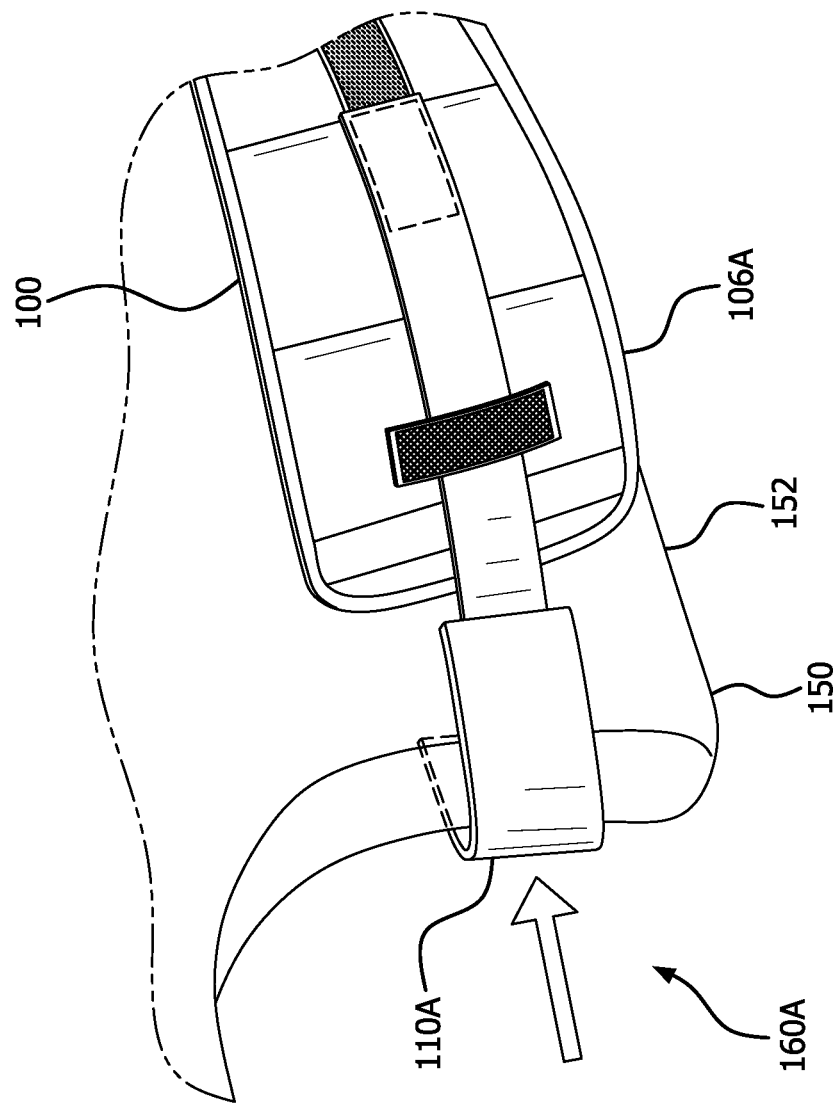
FIG. 6 is a front perspective view of the bracket of FIG. 5 being mounted to the rear bumper of the vehicle.

As shown in FIG. 6, the first support arm 106A is then positioned around a first corner of the bumper 150 (for example, the driver side corner of the bumper 150), and the first mounting bracket 110A is secured to the bumper 150. More specifically, the first mounting bracket 110A is positioned in a first wheel well 160A of the vehicle 152, for example, the driver side rear wheel well 160A, and "hooked" to the bumper 150. Similarly, although not specifically illustrated, the second support arm 106B is then positioned around a second corner of the bumper 150 (for example, the passenger side corner of the bumper 150), and the second mounting bracket 110B is secured to the bumper 150. More specifically, the second mounting bracket 110B is positioned in a second wheel well 160B of the vehicle 152, for example, the passenger side rear wheel well 160B, and hooked to the bumper 150.

Figure 7:
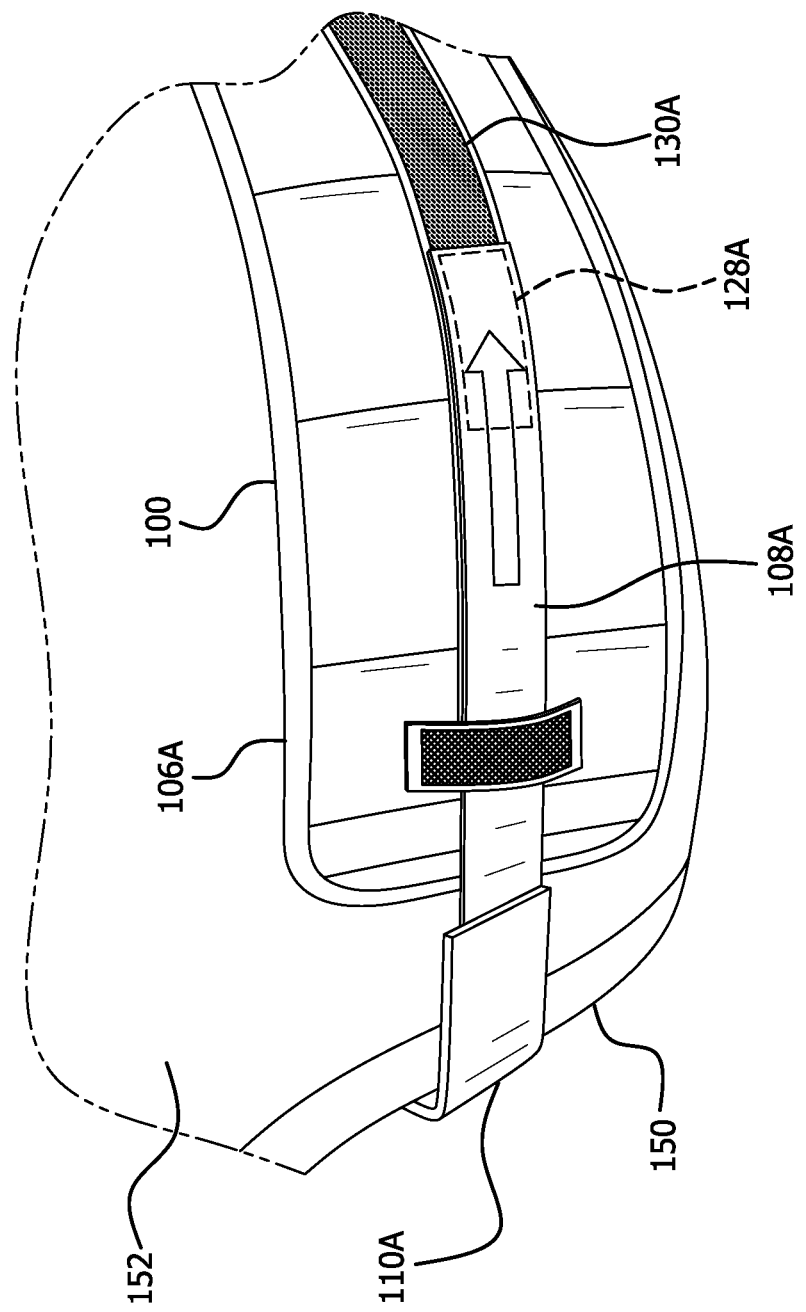
FIG. 7 is a front perspective view of a side mounting strap of the bumper protector of FIG. 1 being tensioned.

As shown in FIG. 7, the first side mounting strap 108A is then tightened to further secure the first side mounting bracket 110A to the bumper 150. More specifically, the first side mounting strap 108A may be detached from the first support arm 106A (by uncoupling the plurality of hooks 128A from the plurality of loops 130A), pulled toward the middle of the vehicle 152, and reattached to the first support arm 106A (by coupling the plurality of hooks 128A to the plurality of loops 130A). Similarly, although not specifically illustrated, the second side mounting strap 108B is tightened to further secure the second side mounting bracket 110B to the bumper 150. More specifically, the second side mounting strap 108B may be detached from the second support arm 106B (by uncoupling the plurality of hooks 128B from the plurality of loops 130B), pulled toward the middle of the vehicle 152, and reattached to the second support arm 106B (by coupling the plurality of hooks 128B to the plurality of loops 130B). The bumper protector 100 thereby occupies a deployed configuration and inhibits or prevents bumper damage from contact with other objects.

Figure 8:
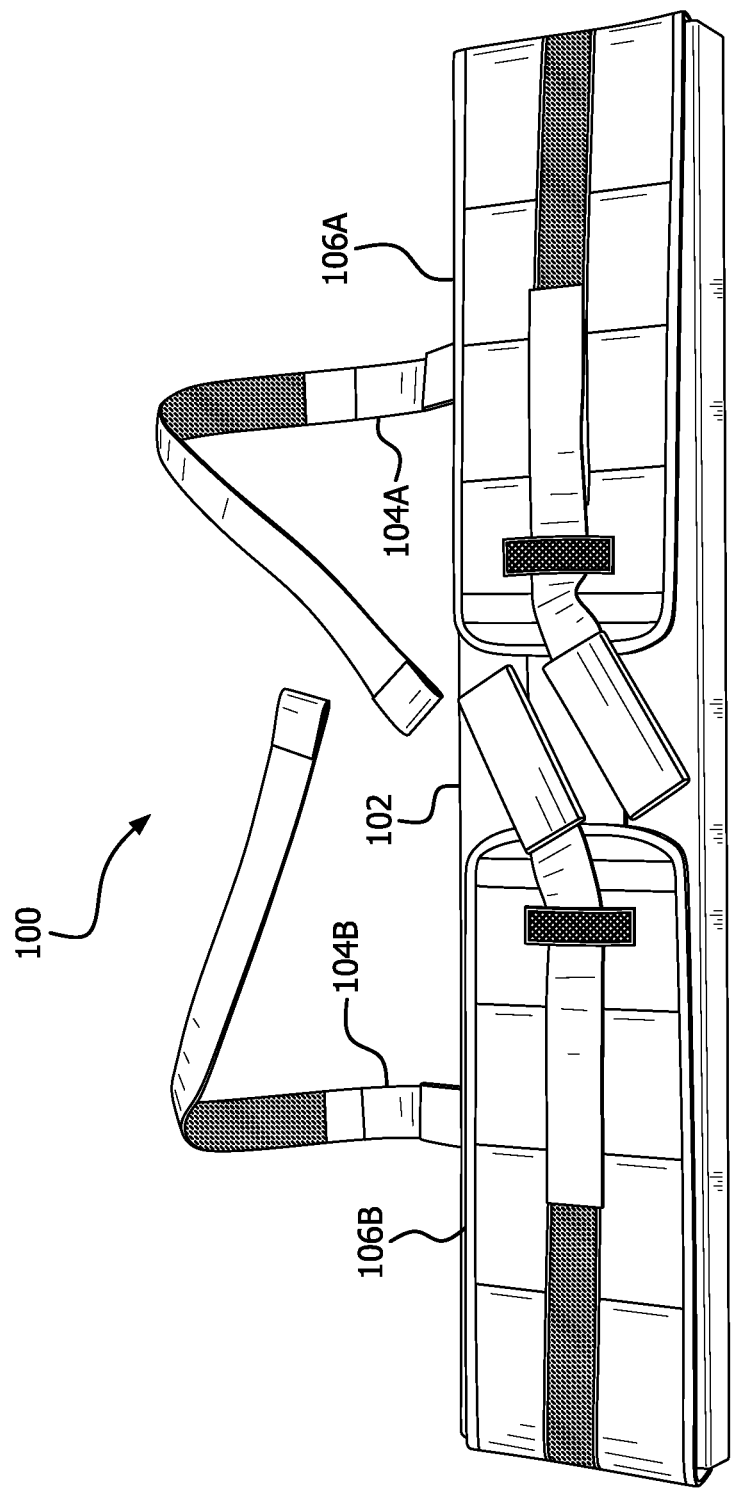
FIG. 8 is a rear view of the bumper protector of FIG. 1 in a folded configuration.

To detach the bumper protector 100 from the bumper 150 of the vehicle 152, the above actions may be reversed. However, the first mounting bracket 110A and the second mounting bracket 110B may remain bent to their mounting shapes to facilitate subsequent deployment of the bumper protector 100. The bumper protector 100, as shown in FIG. 8, may occupy a folded configuration and may be stored in the vehicle 152 (shown elsewhere), more specifically, within the trunk 158 of the vehicle 152.

The bumper protector 100 may provide one or more of various advantages. For example and referring to FIG. 2, the first side mounting strap 108A and the first mounting bracket 110A may be removable and/or replaceable (for example, via the plurality of hooks 128A and the plurality of loops 130A connecting the first side mounting strap 108A to the first support arm 106A). Similarly, the second side mounting strap 108B and the second mounting bracket 110B may be removable and/or replaceable (for example, via the plurality of hooks 128B and the plurality of loops 130B connecting the second side mounting strap 108B to the second support arm 106B). In other embodiments, the first side mounting strap 108A may be permanently coupled to the first support arm 106A, for example, via stitching, and the second side mounting strap 108B may be permanently coupled to the second support arm 106B.

Figure 9:
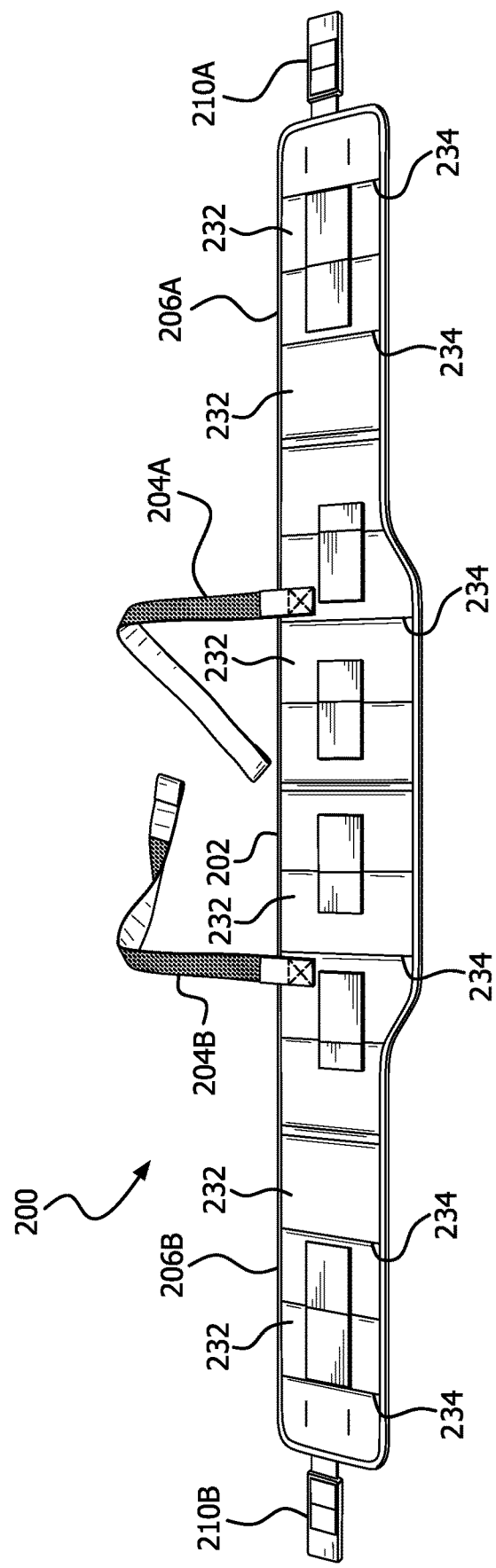
FIG. 9 is a rear view of a bumper protector according to a second embodiment of the present disclosure in an unfolded configuration.
Figure 10:
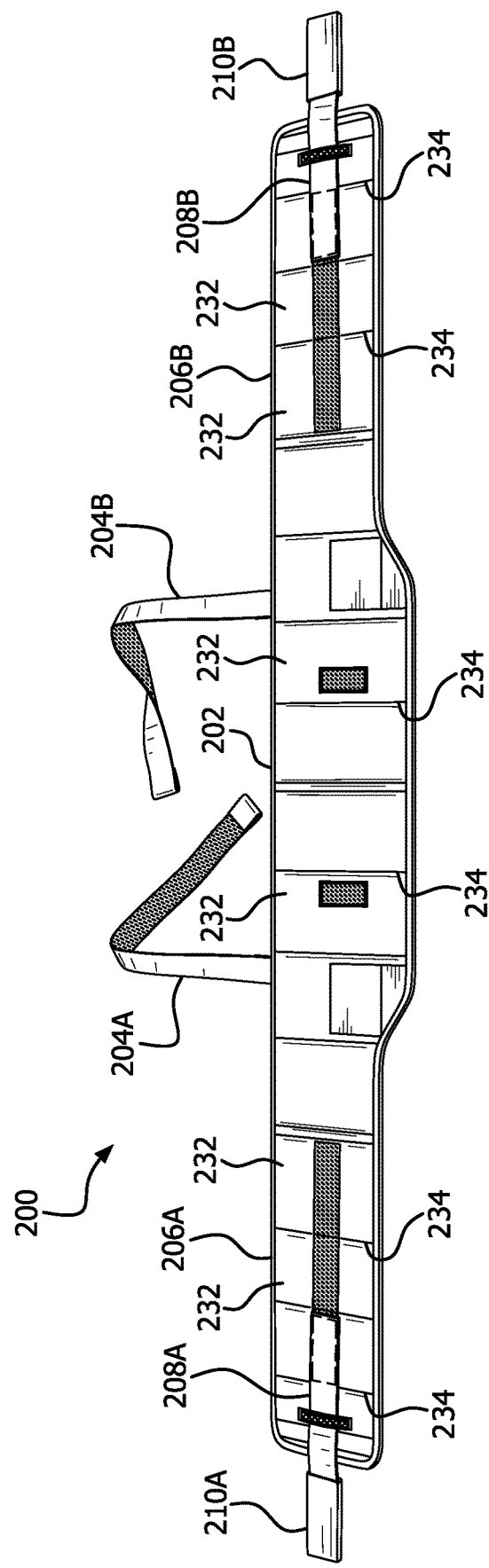
FIG. 10 is a front view of the bumper protector of FIG. 9.
Figure 11:
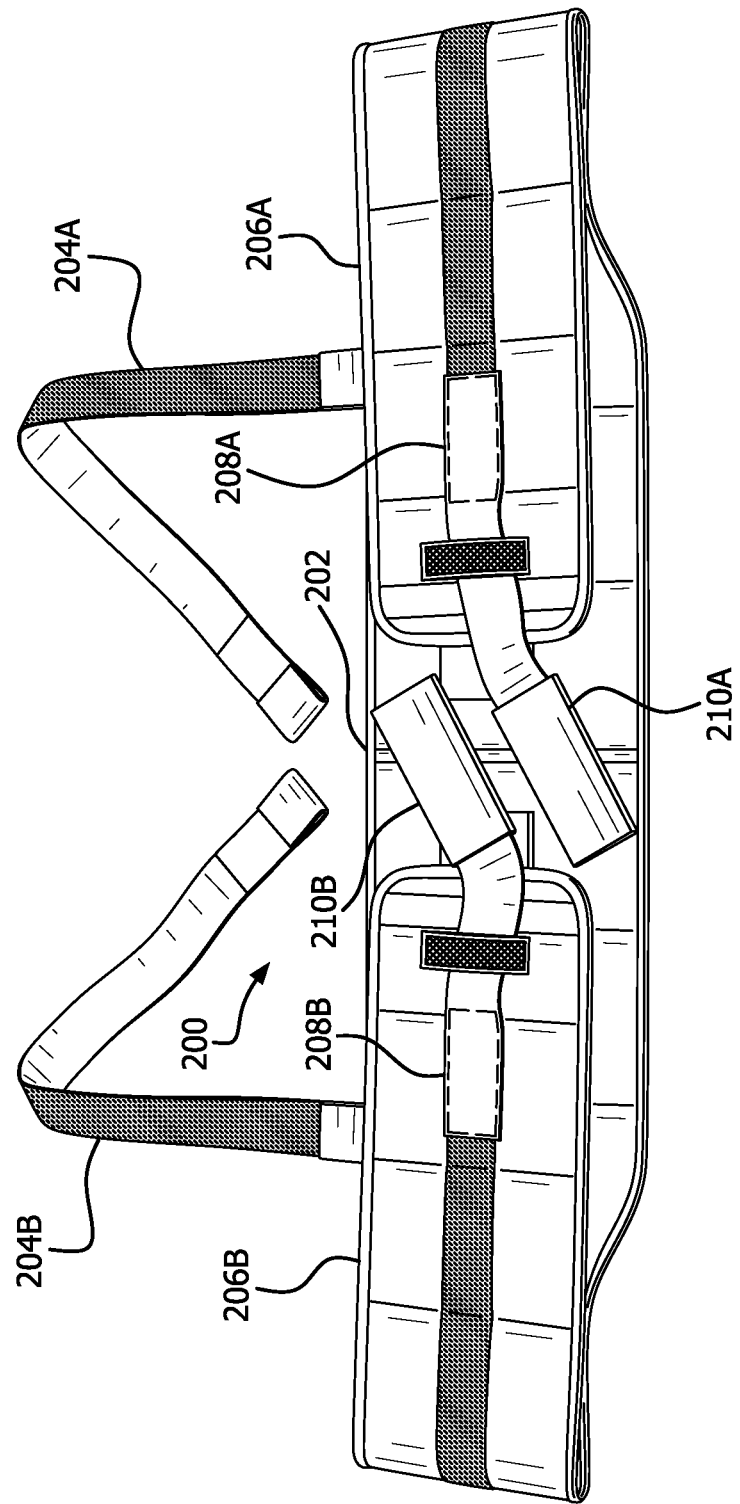
FIG. 11 is a rear view of the bumper protector of FIG. 9 in a folded configuration.

FIGS. 9-11 illustrate a bumper protector 200 according to another embodiment of the present disclosure. The bumper protector 200 is similar to the bumper protector 100 described above. More specifically, the bumper protector 200 includes a includes a cushioning or central portion 202, one or more main mounting straps, illustratively, a first main mounting strap 204A and a second main mounting strap 204B, one or more support arms, illustratively, a first support arm 206A and a second support arm 206B, a first side mounting strap 208A, a second side mounting strap 208B, a first mounting bracket 210A, and a second mounting bracket 210B. In contrast to the bumper protector 100 described above, the bumper protector 200 has a substantially uniform thickness, or the cushioning portion 202, the first side arm 206, and the second side arm 206 have substantially equal thicknesses. Further, each of the cushioning portion 202, the first side arm 206A, and the second side arm 206B may include a plurality of segments 232 that are joined by reduced thickness portions 234 (several of each being identified in FIGS. 9 and 10). The reduced thickness portions 234 may be formed by, for example, generally-vertically extending ribbing or stitching connected to the cover 212. The reduced thickness portions 234 may be more foldable than the plurality of segments 232. The reduced thickness portions 234 may facilitate folding the cushioning portion 202, the first side arm 206A, and the second side arm 206B for storage and/or conforming to a bumper for a more precise fit, thereby providing enhanced surface contact for securing the bumper protector 200 to a bumper. The bumper protector 200 may be mounted to a bumper of a vehicle in a similar to the bumper protector 100 described above.

While exemplary embodiments have been illustrated, it is understood that the present disclosure is not limited thereto. The embodiments may be changed, modified and further applied by those skilled in the art. Therefore, the present disclosure is not limited to the details shown and described, but also includes all such changes and modifications.

What is claimed is:

1. A bumper protector for mounting to a vehicle, the bumper protector comprising:
    a cushioning portion configured to abut a bumper of the vehicle;
    a main mounting strap carried by the cushioning portion and configured to be secured to the vehicle;
    a first support arm carried by the cushioning portion and configured to extend around a first corner of the bumper, the first support arm comprising at least three segments, the at least three segments being foldable to facilitate conformance of the first support arm to the shape of the bumper;
    a first mounting bracket carried by the first support arm, the first mounting bracket configured to extend into a first wheel well of the vehicle and be secured to the vehicle;
    a second support arm carried by the cushioning portion and configured to extend around a second corner of the bumper; and
    a second mounting bracket carried by the second support arm, the second mounting bracket configured to extend into a second wheel well of the vehicle and be secured to the vehicle.

2. The bumper protector of claim 1, further comprising:
    a first side mounting strap coupling the first mounting bracket to the first support arm; and
    a second side mounting strap coupling the second mounting bracket to the second support arm.

3. The bumper protector of claim 2, wherein the first side mounting strap and the second side mounting strap comprise a stretchable material.

4. The bumper protector of claim 2, wherein the first side mounting strap and the second side mounting strap comprise a non-stretchable material.

5. The bumper protector of claim 1, wherein the main mounting strap is a first main mounting strap, and further comprising a second main mounting strap carried by the cushioning portion and configured to be secured to the vehicle.

6. The bumper protector of claim 1, wherein the first support arm and the second support arm are foldable relative to the cushioning portion.

7. The bumper protector of claim 6, further comprising:
    a first fastener configured to secure the first support arm to the cushioning portion when folded relative to the cushioning portion; and
    a second fastener configured to secure the second support arm to the cushioning portion when folded relative to the cushioning portion.

8. The bumper protector of claim 1, wherein the first support arm and the second support arm are permanently coupled to the cushioning portion.

9. The bumper protector of claim 1, wherein the at least three segments of the first support arm are a first at least three segments, and the second support arm comprises a second at least three segments, the second at least three segments being foldable to facilitate conformance of the second support arm to the shape of the bumper.

10. The bumper protector of claim 1, wherein the first support arm further comprises a plurality of reduced-thickness portions coupling and facilitating folding the at least three segments.

11. The bumper protector of claim 10, wherein the plurality of reduced-thickness portions extend vertically.

12. A rear bumper protector for mounting to a vehicle, the rear bumper protector comprising:
    a cushioning portion configured to abut a rear bumper of the vehicle;
    a first main mounting strap carried by the cushioning portion and configured to be secured to a trunk surface of the vehicle;
    a second main mounting strap carried by the cushioning portion and configured to be secured to the trunk surface of the vehicle;
    a first support arm carried by the cushioning portion and configured to extend around a first corner of the rear bumper, the first support arm comprising at least three segments, the at least three segments being foldable to facilitate conformance of the first support arm to the shape of the bumper, the first support arm further comprising a plurality of reduced-thickness portions coupling and facilitating folding the at least three segments, the plurality of reduced-thickness portions extending vertically and formed by ribbing or stitching; and
    a second support arm carried by the cushioning portion and configured and configured to extend around a second corner of the rear bumper.

13. The rear bumper protector of claim 12, wherein the at least three segments of the first support arm are a first at least three segments, and the second support arm comprises a second at least three segments, the second at least three segments being foldable to facilitate conformance of the second support arm to the shape of the bumper.

14. The rear bumper protector of claim 12, further comprising:
    a first mounting bracket carried by the first support arm, the first mounting bracket configured to extend into a first wheel well of the vehicle and be secured to the vehicle; and
    a second mounting bracket carried by the second support arm, the second mounting bracket configured to extend into a second wheel well of the vehicle and be secured to the vehicle.

15. The rear bumper protector of claim 14, wherein the first mounting bracket and the second mounting bracket comprise a bendable material.

16. The rear bumper protector of claim 15, further comprising:
    a first side mounting strap coupling the first mounting bracket to the first support arm; and
    a second side mounting strap coupling the second mounting bracket to the second support arm.

17. The rear bumper protector of claim 16, wherein the first side mounting strap and the second side mounting strap comprise a stretchable material.

18. The rear bumper protector of claim 16, wherein the first side mounting strap detachably couples to the first support arm and the second side mounting strap detachably couples to the second support arm.

19. The rear bumper protector of claim 16, further comprising:
    a first fastener configured to secure the first support arm to the cushioning portion when folded relative to the cushioning portion; and
    a second fastener configured to secure the second support arm to the cushioning portion when folded relative to the cushioning portion.

* * * * *